Figure 1:
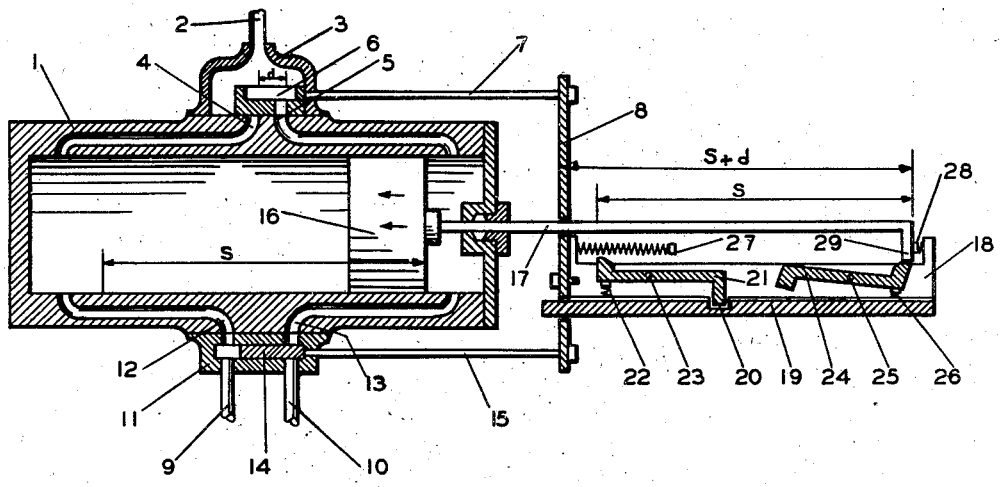

Aug. 20, 1946.  C. D. CANTRELL, JR  2,406,192

SAMPLING APPARATUS

Filed Jan. 26, 1943

FLOW LINE MANIFOLD

INVENTOR.
C.D. CANTRELL JR.

BY Hudson, Young & Ginger

ATTORNEYS.

Patented Aug. 20, 1946

2,406,192

UNITED STATES PATENT OFFICE 2,406,192

SAMPLING APPARATUS

Cyrus D. Cantrell, Jr., Bartlesville, Okla., assignor to Phillips Petroleum Company, a corporation of Delaware Application January 26, 1943, Serial No. 473,653

4 Claims. (Cl. 137—166)

This invention relates to sampling and more particularly to obtaining representative samples of fluids being conveyed through conduits, and is a continuation-in-part of my prior filed application which matured as U. S. Patent No. 2,309,625, on Feb. 2, 1943.

It is often very desirable to know the amount of fluid being produced by a hydrocarbon oil well and the quantity of each component part of that fluid. This knowledge is useful in determining efficient production rates for a hydrocarbon oil well and is necessary for determining the amount of hydrocarbon oil and gas reserves within a reservoir.

Standard practice is to produce a hydrocarbon oil well into a separation system consisting of an oil and gas separator and appropriate receivers, stock tanks, and the like, where oil, gas, and water are separated one from the other and the oil stored. If two or more wells produce into a single separation system or tank battery it is necessary to shut in all the other wells when it is desired to test one well. Shutting in the other wells may be undesirable because of difficulty in reviving flow, settling of sand in pumping equipment, and other common troubles, as well as loss of production during the shut-in period. When testing of individual wells is of primary importance, a special testing system is provided. In the case of high pressure flowing wells, the complete test system requires a substantial investment in equipment even though necessary auxiliary vessels to the oil and gas separator are often omitted at the price of flexibility, accuracy, and safety. In either case it is often necessary to limit the length of the test to shorter periods than are necessary for most accurate results.

The practice of my invention simplifies the procedure of testing individual wells by installing a sampling device in the lease fluid conduit system between the well and the tank battery system. By cutting-out a representative sample of a predetermined fraction of the total fluid passing through the conduit, accurately testing that fraction and returning the same to the original volume, a well may be tested for any desirable length of time without interrupting the operations of the other wells producing into a central tank battery system.

The present invention also eliminates the employment of duplicate systems of separators, receiving tanks, and/or storage tanks which are essential with the present methods of well testing where individual well tests are a necessary operation and where all wells producing into a central storage battery system must be produced continuously and without interruption. The weight and space occupied by this complete sampling apparatus are such that the whole is easily portable on a light truck or trailer and thus can be used to serve several tank batteries for routine tests, or for special well-testing problems, and thereby eliminate the permanent test equipment otherwise necessary. In the case of centralized tank batteries serving a large number of widely scattered wells, this device would eliminate long individual flow lines to that battery, or standard test equipment at the junction of each small group of flowlines.

The primary object of this invention is to provide an improved fluid sampling apparatus.

Another object is to provide an improved apparatus for taking a representative sample of fluid from a conduit.

A still further object is the provision of an improved apparatus for taking a representative sample of fluid produced from a hydrocarbon oil well, said sample being taken at some desirable point in a lease fluid conduit system for the purpose of testing component parts of the fluid.

Figure 2:
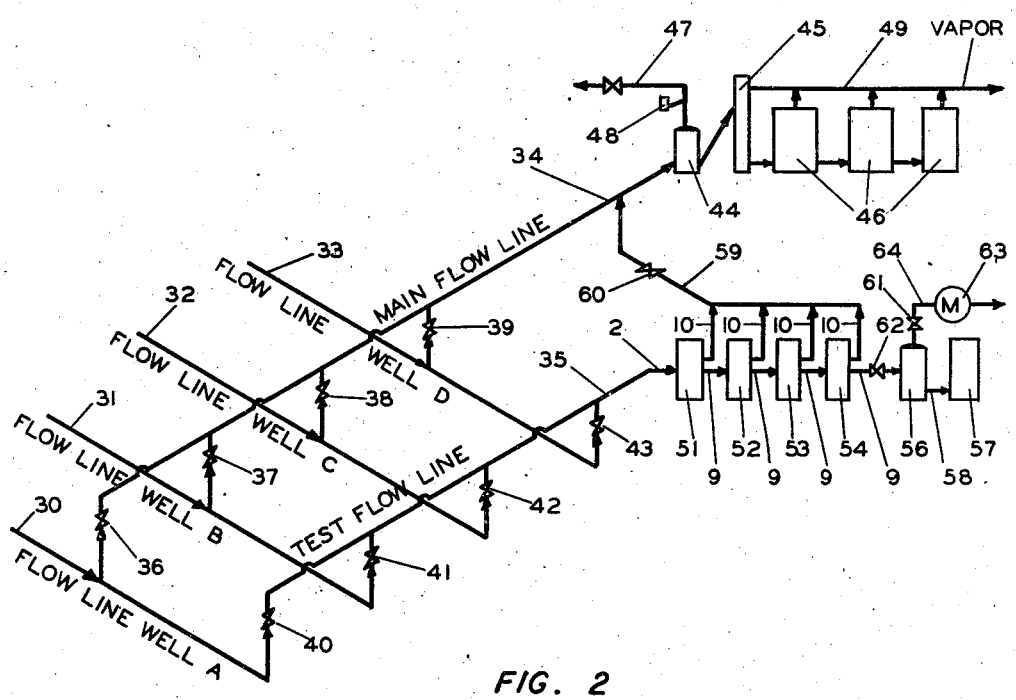

These and additional objects and advantages will be readily apparent to persons skilled in the art by reference to the following description and annexed drawing which pertains to a preferred embodiment of my invention, and wherein Figure 1 represents a positive displacement type of device, partly in central longitudinal cross section, for obtaining representative fluid samples; and, Figure 2 denotes a typical conduit and separation system for a group of hydrocarbon oil wells and having the sampling apparatus of Figure 1 incorporated therein.

For the purpose of illustration, the application of this invention is shown with respect to obtaining samples of fluid as produced from a hydrocarbon oil well and as conveyed through the customary lease conduit system. It is to be understood that this is only one of the many uses to which this device may be satisfactorily and economically applied in actual practice.

Referring to Figure 1, I have illustrated therein a closed cylinder or chamber 1 that communicates with an inlet conduit 2 through a valve chest 3 and ports 4 and 5, alternately opened and closed by a slide valve 6 fixed to a valve rod 7 which is coupled to a crosshead 8. Cylinder 1 also communicates with outlet or exhaust conduits 9 and 10 through a valve chest 11 and exhaust ports 12 and 13 which are alternately opened and closed by a slide valve 14 fixed to a slide rod 15 and crosshead 8. Cylinder 1 contains a piston 16 secured to a piston rod 17 which is slidable through one end of the cylinder. Attached to crosshead 8 is a valve-operating mechanism including a member 18, that is fixedly secured to the crosshead and movable therewith, and a plate 19 having a recess or notch 20. Plate 19 is slidable with respect to member 18 and crosshead 8. Member 18 carries a pair of latches 21 and 24 which are pivoted at 23 and 25, respectively. Each of said latches is provided with a downwardly extending portion, that is adapted to engage notch 20 depending upon the relative position of member 18 and plate 19, and an upwardly extending portion. A compression spring 22 tends to rotate latch 21 in a clockwise direction about its pivot point 23, while a similar spring 26 tends to rotate latch 24 in a counterclockwise direction about its pivot point 25. As will be noted from an examination of Figure 1, member 18 is so positioned with respect to plate 19 that the downwardly extending portion of latch 21 has been received in notch 20, whereas the corresponding portion of latch 24 rests on the upper surface of plate 19. A pair of preferably coaxially disposed compression springs 27 and 28 are attached to member 18 and are adapted to be alternately compressed by an arm 29 that is secured to valve rod 17.

Turning next to the system illustrated in Figure 2, I have denoted therein a plurality of well flowlines 30, 31, 32, and 33, each of which communicates with a separate producing oil well. A main flowline 34 connects with well flowlines 30, 31, 32, and 33 through valved branch lines 36, 37, 38, and 39, respectively. A test flowline 35 also connects with well flowlines 30, 31, 32, and 33 through valved branch lines 40, 41, 42, and 43, respectively. Main flowline 34 discharges into a tank battery hookup that may be of any known design such as the illustrated arrangement of equipment which consists in its essential elements of a gas-liquid separator 44 that communicates with a boot 45 which in turn communicates with a plurality of stock tanks 46 that are connected in series. Gas that is separated from the well fluid in separator 44 is taken off overhead through a line 47 as allowed by a pressure regulator device 48. Vapors evolved in boot 45 and stock tanks 46 are transmitted therefrom through a vapor line 49.

Test flowline 35 discharges into a battery containing cylinders 51, 52, 53, and 54, each of which is preferably identical in design with the mechanism described in Figure 1. As shown in the Figure 2, one of the two discharge conduits of each cylinder, namely, conduit 10, is connected to a return conduit 59 while the other discharge conduit namely, conduit 9, is connected to the next cylinder except in the case of cylinder 54 where said other discharge conduit 9 is connected to a small test separator 56. Separator 56 is connected to a receiving tank 57 by a conduit 58, and to a gas meter 63 by a conduit 64. Return conduit 59 is connected to main flowline 34. 60, 61, and 62 are appropriate check and regulating valves.

Referring to Figure 1, in operation fluid from a hydrocarbon oil well enters cylindrical chamber 1 through conduit 2. Let us assume that piston 16 is in the position shown in Figure 1 and is moving in the direction indicated by the arrows; that both ends of the cylinder are filled with well fluid; and, that the positions of the slide valves 6 and 14 are shown, with port 4 closed, port 5 open, port 13 closed, and port 12 open. The fluid entering conduit 2 is under substantially the same pressure as that existing in the test flowline 35 and causing the flow of fluid through it, and this pressure is exerted against the right-hand side of piston 16. The pressure on the left-hand side of piston 16 is allowed to be less than that on the opposite side by adjustment of regulating valves 60 and 62, so that piston 16 moves toward the left. As the right-hand end of the cylinder fills with fluid through conduit 2 the left-hand end discharges fluid through conduit 9. As piston 16 moves toward the left, arm 29 engages and compresses spring 27. Compression of spring 27 continues until arm 29 engages and depresses the upwardly extending portion of latch 21, thus compressing spring 22 and releasing the downwardly extending portion of latch 21 from notch 20. At this point member 18 slides to the left on plate 19 moving crosshead 8, valve rods 7 and 15, and slidevalves 6 and 14 to the left the distance d in Figure 1. When slide valves 6 and 14 have reached a position such that ports 4 and 13 are open, the downwardly extending portion of latch 24 is forced to drop into notch 20 by spring 26 and locks slidevalves 6 and 14, connecting valve rods 7 and 15, and crosshead 8 and member 18 in the new position. Fluid entering conduit 2 now exerts pressure against piston 16 on the left end thereof causing piston 16 to move to the right the distance s and discharge the fluid in the right end of cylinder 1 through port 13 into conduit 10. Piston 16 moves to the right until arm 29 engages and compresses spring 28 and finally depresses and releases latch 24 from notch 20, allowing member 18 to slide to the right on plate 19 and to move slidevalves 6 and 14 to the right through valve rods 7 and 15 and crosshead 8 through distance d. When valves 6 and 14 have again reached the position shown in Figure 1, with ports 5 and 12 open and ports 4 and 13 closed, latch 21 drops again into recess 20 and locks the valve mechanism in this position. Fluid now reenters the right end of cylinder 1 through port 5 and conduit 2, comprising one cycle of operation of one cylinder unit of the device.

Referring to Figure 2, let us assume it is desired to sample and meter the component parts of oil, water, and gas flowing from the well connected to well flowline 30 and to make certain tests upon the oil and gas at predetermined conditions of separation. Flowline 30 is cut out of flowline 34 by closing branch line 36 and opening branch line 40, leaving branch lines 37, 38, and 39 open, and closing branch lines 41, 42, and 43. The fluid in line 30 now all flows through flow test line 35. Fluid from flow line 35 enters cylinder 51 through conduit 2. Cylinder 51 divides the fluid admitted thereinto into two equal parts; the right end discharges fluid into conduit 10 and the left end into conduit 9. Conduit 10 discharges fluid into return line 59 which conducts the fluid back into main flowline 34. Conduit 9 conducts the fluid from the left end of the cylinder to the inlet conduit of cylinder 52. Cylinder 52 divides the fluid passing through conduit 9 into two equal parts also, discharging one-half into return line 59, and the other half into cylinder 53. Any number of cylinders connected in series may be employed depending upon the desired quantity of the final sample, which decreases in a geometric progression. For example, two cylinders would permit taking a sample which is an exact ¼ of the initial quantity in weight and composition. Three cylinders would provide a sample of ⅛; four cylinder, $\frac{1}{16}$; five cylinders, $\frac{1}{32}$; and so on. If the sampling period is sufficiently long, the law of averages will operate to allow the composition of the sample to be quantitatively the same as that of the total fluid flow during the test period, and the weight to be the predetermined exact fraction.

In employing the system shown in Figure 2, the final sample enters the small separator 56 where the gas is separated from the oil and water. The gas passes through conduit 64 to gas meter 63 where its volume is measured. The oil and water pass from separator 56 through conduit 58 to receiving tank 57, where they are separated by gravity and their volumes are measured. By multiplying the weight of the components of the sample by the reciprocal of the fraction by which it was reduced, the weight of each component which flowed from the well during the test period is determined with a high degree of accuracy.

It is to be understood that the above form of my invention herewith shown and described is to be taken as a preferred example of the same and that various changes in size, shape, and arrangement or application may be resorted to without departing from the spirit of the invention, and further, that the theories of operation, as set out in this invention, although believed to be sound and workable, are not to be construed as the sole basis for operating this device. This device operates successfully whether or not upon the principles described herein, and is to be limited only by the appended claims. Further it is to be understood that the phrase "a sample receptacle" when used in the claims refers not only to a separator such as 56 but also to the succeeding cylinders such as 52, 53 and 54.

I claim:

1. A system of the character described comprising a fluid flow conduit; a plurality of means arranged in series for successively dividing fluid admitted into each of them into substantially equal parts, each of said means including a cylinder, a piston reciprocable within the cylinder, intake means including a valve operated by said piston at the end of each stroke thereof for alternately conveying fluid into each end of the cylinder, a fluid sampler line and a fluid discharge line connected to the cylinder, and means including a valve for alternately discharging fluid admitted into the cylinder through the fluid sampler line and the fluid discharge line during each complete stroke of the piston, the intake means of the first cylinder of the series being connected to the flow conduit, the intake means of each succeeding cylinder of the series being connected to the fluid sampler line of each preceding cylinder of the series, the fluid discharge line of each cylinder communicating with the flow conduit down stream of the intake means of the first cylinder of the series, and a sample receiving receptacle connected to the fluid sampler line of the last cylinder of the series.

2. A system of the character described comprising a plurality of well flow lines adapted to transmit fluid produced by corresponding oil wells, a main flow line, a test flow line, valved means for placing the well flow lines into and out of communication with the main flow line and the test flow line as desired, a plurality of means arranged in series for successively dividing fluid transmitted into each of them into substantially equal parts, each of said plurality of means including a cylinder, a piston reciprocable within the cylinder, intake means including a valve operated by said piston at each end of its stroke for alternately conveying fluid into each end of the cylinder, a fluid sampler line and a fluid discharge line connected to the cylinder, and means including a valve for alternately discharging fluid conveyed into the cylinder through the fluid sampler line and the fluid discharge line during each complete stroke of the piston, the intake means of the first cylinder of the series being connected to the test flow line, the intake means of each succeeding cylinder of the series being connected to the fluid sampler line of each preceding cylinder of the series, the fluid discharge line of each cylinder communicating with the main flow line down stream of the connection of the test flow line with the main flow line, and a sample receiving receptacle connected to the fluid sampler line of the last cylinder of the series.

3. In an apparatus for obtaining representative samples of a flowing stream of fluid, a main flow line for said stream, a cylinder, a piston reciprocable within the cylinder, means including a valve for alternatively conveying fluid from the main flow line at a given point into each end of the cylinder, a fluid sampler line connected to one end of said cylinder, a sample receptacle connected to said fluid sampler line, a discharge line connecting the other end of said cylinder to said main flow line down stream of said given point, and means including a valve for alternately establishing communication between the cylinder and said sampler and discharge lines, whereby a given quantity of fluid from the main line is delivered in definite proportions to said sample receptacle and back into said main flow line.

4. In the combination of claim 3, each of said means including a valve including means actuated by said piston for operating said valves.

CYRUS D. CANTRELL, Jr.